United States Patent
Zhang et al.

(10) Patent No.: US 6,489,060 B1
(45) Date of Patent: Dec. 3, 2002

(54) RECHARGEABLE SPINEL LITHIUM BATTERIES WITH GREATLY IMPROVED ELEVATED TEMPERATURE CYCLE LIFE

(75) Inventors: Meijie Zhang; Yu Wang, both of Coquitlam; Jan Naess Reimers, Maple Ridge; Michael Gee, Vancouver, all of (CA)

(73) Assignee: E-One Moli Energy (Canada) Limited, Maple Ridge (CA)

( * ) Notice: Subject to any disclaimer, the term of this patent is extended or adjusted under 35 U.S.C. 154(b) by 0 days.

(21) Appl. No.: 09/484,399

(22) Filed: Jan. 14, 2000

Related U.S. Application Data

(63) Continuation-in-part of application No. 09/318,854, filed on May 26, 1999, now abandoned.

(51) Int. Cl.[7] .......................... H01M 4/50; H01M 4/58; H01M 6/00
(52) U.S. Cl. .................... 429/224; 429/231.1; 29/623.1
(58) Field of Search ............................. 429/224, 231.1; 29/623.1

(56) References Cited

U.S. PATENT DOCUMENTS

| | | | |
|---|---|---|---|
| 4,225,657 A | 9/1980 | Klein et al. ................. | 429/248 |
| 5,147,738 A | 9/1992 | Toyoguchi | |
| 5,424,145 A | 6/1995 | Tomantschger et al. ...... | 429/57 |
| 5,478,673 A | 12/1995 | Funatsu | |
| 5,705,291 A | 1/1998 | Amatucci et al. | |
| 5,759,720 A | 6/1998 | Amatucci | |
| 5,882,218 A | 3/1999 | Reimers ..................... | 429/224 |
| 5,882,821 A | 3/1999 | Miyasaka | |
| 5,891,592 A | 4/1999 | Mao et al. | |
| 5,964,902 A | 10/1999 | Mao et al. .................. | 29/623.1 |
| 6,074,777 A | 6/2000 | Reimers et al. ............... | 429/61 |
| 6,090,505 A | 7/2000 | Shimamura et al. ...... | 429/218.1 |
| 6,183,718 B1 * | 2/2001 | Barker et al. ................ | 423/599 |
| 6,248,477 B1 * | 6/2001 | Howard et al. ............. | 429/224 |

FOREIGN PATENT DOCUMENTS

| | | |
|---|---|---|
| JP | 05047384 | 2/1993 |
| JP | 09134723 | 5/1997 |
| JP | 10302767 | * 11/1998 |

OTHER PUBLICATIONS

Wang et al. Proposed Mechanism for Cycling Fade in LiMn2O4 Li–Ion Cells. Jul. 1998.*
Larcher, D. et al., *J. Electrochem. Soc.*, vol. 145, No. 10, Oct. 1998, pp. 3392–3400.
Aurbach, D. et al., *J. Electrochem. Soc.*, vol. 141, No. 1, Jan. 1994, pp. L1–L3.
Aurbach, D. et al., *J. Electrochem. Soc.*, vol. 142, No. 6, Jun. 1995, pp. 1746–1752.
Aurbach, D. et al., *J. Electrochem. Soc.*, vol. 142, No. 9, Sep. 1995, pp. 2873–2882.
Yu Wang, et al., Poster III, The 9th International Meeting on Lithium Batteries, Edinburgh, Scotland, Jul. 1998.

* cited by examiner

*Primary Examiner*—Carol Chaney
*Assistant Examiner*—Tracy Dove
(74) *Attorney, Agent, or Firm*—Synnestvedt & Lechner LLP

(57) ABSTRACT

The loss in delivered capacity (capacity fade) after cycling non-aqueous rechargeable lithium manganese oxide batteries at elevated temperatures can be greatly reduced by depositing a small amount of certain foreign metal species on the surface of spinel in the cathode. In particular the foreign metal species are from compounds having either bismuth, lead, lanthanum, barium, zirconium, yttrium, strontium, zinc or magnesium. The foreign metal species are introduced to the surface of spinel by moderately heating either an aqueous treated mixture or a dry mixture of ready-made spinel and the foreign metal compound.

32 Claims, 9 Drawing Sheets

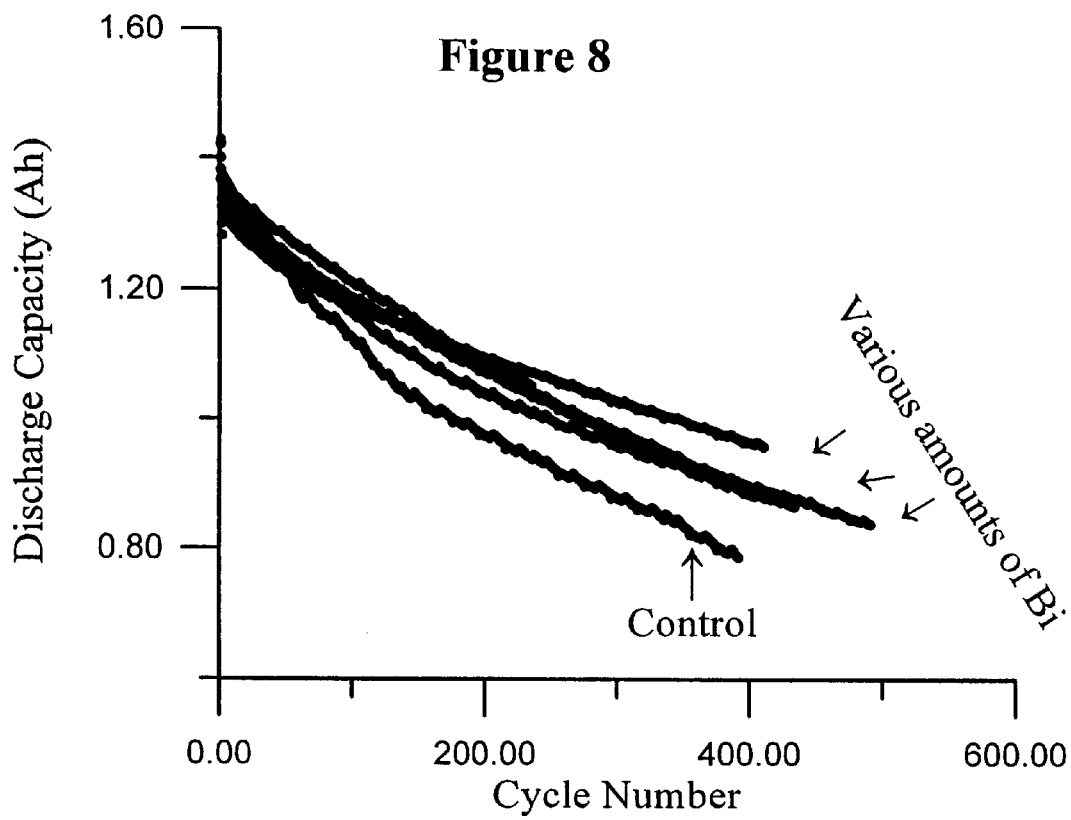
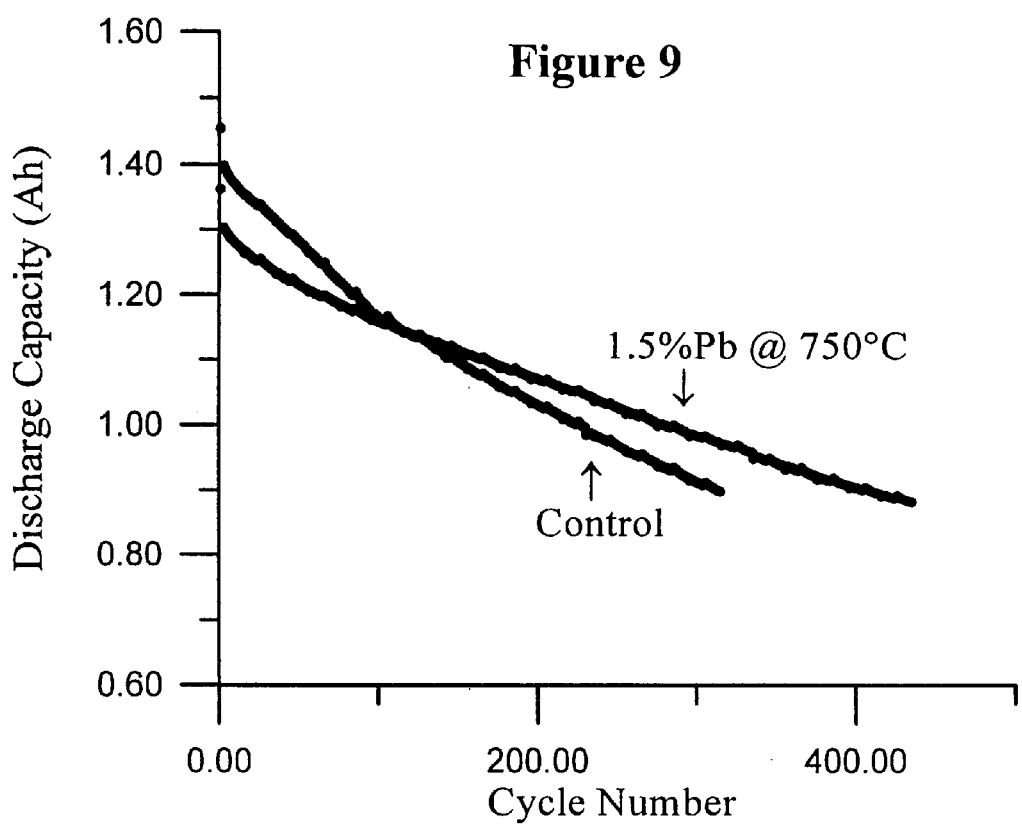

RECHARGEABLE SPINEL LITHIUM BATTERIES WITH GREATLY IMPROVED ELEVATED TEMPERATURE CYCLE LIFE

This application is a continuation-in-part of application Ser. No. 09/318,854, filed May 26, 1999, now abandoned.

FIELD OF THE INVENTION

This invention pertains to non-aqueous rechargeable lithium manganese oxide batteries with greatly improved cycling performance at elevated temperatures, and methods of producing such batteries. Specifically, the invention pertains to using deposits of certain metal compounds, particularly ones containing Y, Bi, Pb and La, on the surface of a spinel cathode as means to stabilize the spinel surface, thereby avoiding the capacity loss.

BACKGROUND OF THE INVENTION

Various types of non-aqueous rechargeable lithium ion batteries are available commercially for consumer electronics applications. Lithium ion batteries use two different insertion compounds for the active cathode and anode materials. Presently available lithium ion batteries are high voltage systems based on $LiCoO_2$ cathode and coke or graphite anode electrochemistries. However, many other lithium transition metal oxide compounds are suitable for use as the cathode material, including $LiNiO_2$ and $LiMn_2O_4$. Also, a wide range of carbonaceous compounds is suitable for use as the anode material. These batteries employ non-aqueous electrolytes comprising $LiBF_4$ or $LiPF_6$ salts and solvent mixtures of ethylene carbonate, propylene carbonate, diethyl carbonate, and the like. Again, numerous options for the choice of salts and/or solvents in such batteries are known to exist in the art.

The rechargeable lithium battery industry has found that $LiMn_2O_4$ can be a more desirable cathode material than $LiCoO_2$, because of its low cost and its relative harmless effect on the environment. Therefore, research efforts to use $LiMn_2O_4$ as the cathode material of choice have increased.

Typically $LiMn_2O_4$ based batteries have good performance at room temperature. However, at elevated temperatures they suffer a gradual loss of delivered capacity with cycle number, herein referred to as capacity fade or the capacity fade rate. Researchers in the art have devoted substantial effort to reducing this loss in capacity.

There are many patents/patent applications and articles in the literature claiming that doping with a foreign metal or a combination of metals during the synthesis of $LiCoO_2$ or $LiMn_2O_4$ improves capacity and/or capacity fade. For instance, U.S. Pat. No. 5,147,738 (Yoshinori Toyoguchi) claims improved cycle life of $LiCoO_2$ batteries by using cathode active material containing $Li_xCo_{1-y}M_yO_2$, where M=W, Mn, Ta, Ti, Nb; Japanese published application serial number 09134723 (Okada et. al.) uses $Li_yMn_{2-x}M_xO_4$, cathodes where M=Fe, Ti, Ni, Ta, Cr, W, Pb, etc. to obtain large total discharge capacity; U.S. Pat. No. 5,759,720 (Glenn Amatucci) discloses capacity and capacity fade improvement at 55° C. for lithium rechargeable batteries using lithium aluminum manganese oxy-fluoride cathodes.

Addition of Bi is known to improve the stability of manganese oxides used in the so called RAM (Rechargeable Alkaline Manganese) battery technology. In the context of such aqueous alkaline cells, D. Larcher et. al. (J. Electrochem. Soc., Vol. 145, No.10, pp.3392–3400) study the effects of Bi, Pb and Tl doping, on the stability of λ-$MnO_2$ (the de-lithiated form of $LiMn_2O_4$) when stored in aqueous acidic media. Larcher et al. characterize stability by measuring the rate at which Mn is dissolved from the solid phase, and no capacity fade measurements where carried out in electrochemical cells. Brief mention is made of the storage characteristics of Bi doped $LiMn_2O_4$ in non-aqueous acidic electrolyte, and it appears from the reported X-ray data that the stability was not improved by Bi doping.

Matsushita Electric Co. Ltd.'s laid open Japanese application serial number 05047384 (Yamaura et. al.). claims improved overdischarge at high temperature by using their cathode. The cathodes here are made from powder obtained from simply mixing spinel powder with metal oxide powder. The mixed powders are not heat treated before they are made into a slurry for cathode coating. This is definitely not a surface coating technique.

Coating the surface of $LiMn_2O_4$ to obtain specific effects has been investigated. For example, in U.S. Pat. No. 5,705,291 (Amatucci et al.) the self discharge rate of batteries stored at 55° C. is reduced by treating the surface of the lithium intercalating cathode material with a passivating layer containing an annealed coating composition of boron oxide. The inventors show no evidence that capacity fade is improved by this treatment.

Thus far, the compounds and methods attempted in the prior art either give marginal improvements in capacity fade rate at elevated temperatures or attempt to solve other problems facing lithium manganese oxide batteries.

SUMMARY OF THE INVENTION

Rechargeable batteries exhibit a loss in delivered capacity as a function of the number of charge/discharge cycles. Herein, the fractional loss of capacity per cycle is referred to as the capacity fade rate. The instant invention includes non-aqueous rechargeable lithium manganese oxide batteries having greatly improved capacity fade rates at elevated temperatures and methods for achieving the improved capacity fade rate. Non-aqueous rechargeable spinel batteries generally comprise a lithium manganese oxide cathode, a lithium compound anode, a separator and a non-aqueous electrolyte comprising a lithium salt dissolved in a non-aqueous solvent and are hereinafter called spinel or $Li_{1+x}Mn_{2-x}O_4$ ($0<=x<0.33$) batteries. We have discovered that heating a mixture of a small amount of one or more of certain foreign metal compounds with $Li_{1+x}Mn_{2-x}O_4$ powder can result in a reduced capacity fade rate at elevated temperatures in spinel lithium ion batteries. Preferably, the temperature applied to heat the mixture is high enough so that the foreign metal compound is converted to foreign metal products, which cover the surface of the spinel and do not enter the bulk of the spinel structure. Such treated spinel powders serve to reduce the capacity fade of spinel lithium-ion batteries at elevated temperatures. Hereinafter synthesized $Li_{1+x}Mn_{2-x}O_4$ powder will be referred to as ready-made spinel. This is to distinguish it from either the actual synthesis of spinel, where precursors such as $EMD-MnO_2$ and $Li_2CO_3$ are heated to obtain $Li_{1+x}Mn_{2-x}O_4$ or from doped spinel, where for example, $EMD-MnO_2$, $Li_2CO_3$ and $Bi_2O_3$ are heated to obtain $Li_{1+x}Mn_{2-x-y}Bi_yO_4$.

During cycling, lithium-ion cells tend to produce alcohols such as methanol or ethanol as a result of reactions between trace amounts of $H_2O$ and the materials forming the Solid Electrolyte Interface (SEI) layer on the anode (Aurbach et. al., J. Electrochem. Soc. 141, L1 (1994), ibid. 142, 1746 (1995), ibid. 142, 2873 (1995)). The alcohol in turn oxidizes on the surface of the charged or de-lithiated cathode, and produces more water. Water then reacts irreversibly with more SEI material and possibly with some intercalated lithium in the anode. Once intercalated Li has reacted with water to form LiOH, it is permanently inactive and the cell capacity decreases correspondingly. In particular, the effect is most prominent in spinel lithium ion batteries at elevated temperature as shown in Yu Wang et al., co-inventors of this invention (Poster III, The 9th International Meeting on Lithium Batteries, Edinburgh, Scotland, July 1998).

The rate of methanol reaction can be used to gauge whether specific treatments of ready-made spinel powder will improve the capacity fade of spinet batteries at elevated temperatures. That is, the charged or de-lithiated spinel, henceforth known herein as $\lambda$-$MnO_2$, in question can be soaked in a known amount of methanol, and then the water produced from the oxidation reaction of methanol and the cathode can be measured over time. The less water produced by a surface treated cathode relative to a reference cathode of untreated spinel, the lower the capacity fade rate is expected when the lithium-ion battery is cycled at elevated temperatures.

We have found that not all foreign metal surface treatments work to improve the capacity fade rate of spinel batteries. So far, according to our research, the foreign metal compounds that are able to achieve a significant capacity fade improvement contain either bismuth (Bi), lead (Pb), lanthanum (La), barium (Ba), zirconium (Zr), yttrium (Y), strontium (Sr), zinc (Zn) or magnesium (Mg). In particular, lead acetate, lead basic carbonate, lead stearate, lead nitrate, bismuth nitrate, bismuth hydroxide, bismuth oxycarbonate, bismuth acetate, bismuth oxide, lanthanum carbonate, lanthanum perchlorate, lanthanum nitrate, barium nitrate, zinc acetate, and zirconium di-nitrate oxide,yttrium (III) nitrate, strontium nitrate, zinc acetate and magnesium nitrate can be used to reduce the fade rate at elevated temperatures.

One of the preferred methods for obtaining the surface treated cathode powder is to dissolve. a suitable amount of one or more of certain foreign metal compounds into water and then mix it with ready-made spinel powder for less than an hour. After drying at about 95° C. for an hour, the resulting mixture is further heated at above the decomposition temperature of the foreign metal compound, and less than or equal to 750° C., for 2 to 4 hours. Preferably the heating temperature is 350° C. Heating removes the moisture and forms the foreign metal product on the surface of the spinel. This method will henceforth be called aqueous treatment or aqueous treated.

To make it easier for processing large quantities of treated spinel powder, another preferred method is to dry mix the foreign metal compound with the ready-made spinel, then heat the mixture initially at above the decomposition of the foreign metal compound for about 1 hour, then further heat it at about 600° C. and up to 750° C. for 1.5 hours. Hereinafter this method is called dry-mix treatment. The prepared powders are then ready for cathode making and subsequently for battery assembling.

Herein the amount of foreign metals used for the surface treatment will be expressed in terms of the number of foreign metal atoms per spinel formula unit and will be referred to as mole % foreign metal:

$$\% M = \frac{N_M}{N_{Li_{1+2}Mn_{2-2}O_4}} \times 100\%$$

wherein M is the foreign metal and $N_M$ is the number of the foreign metal atoms compared to the number of spinel formula units. It has been discovered that adding an amount of one or more certain foreign metal compounds to the ready-made spinel in the range from 0.01 to less than about 5 mole % of the foreign metal, then heating the mixture, can be effective in improving capacity fade rate at elevated temperature. A preferred range is from about 0.05% to less than 2 mole % of the foreign metal. Preferably only a small amount of capacity fade reducing foreign metal compound is employed.

It has further been discovered that the inventive treatments result in the foreign metal products being distributed on the surface of the spinel structure rather than being embedded in the spinel structure, as in the case of doping. That is, the foreign metal species do not enter the bulk of the spinel particles or the crystal structure. Therefore, the spinel structure and its lattice constant remain essentially unchanged.

Aside from treating the spinel material, improved capacity fade rates at elevated temperatures can be achieved for spinel batteries by employing conventional lithium ion battery electrochemistries. Thus, the cathode comprises a surface treated spinel made by heating a mixture of one or more certain foreign metal compounds (bismuth, lead, lanthanum, barium, zirconium, yttrium, strontium, zinc or magnesium compounds) with ready-made lithium manganese oxide. The anode can be a carbonaceous insertion compound anode, in particular graphite. The electrolyte can contain $LiPF_6$ salt dissolved in an organic carbonate solvent, in particular mixtures containing ethylene carbonate, propylene carbonate, ethyl methyl carbonate, and/or diethyl carbonate solvents.

The invention is directed to a non-aqueous rechargeable lithium manganese oxide battery having reduced capacity fade rate during cycling at elevated temperature, the said battery comprising: a lithium insertion compound cathode, a lithium compound anode, a separator, and a non-aqueous electrolyte including a lithium salt dissolved in a non-aqueous solvent, wherein the cathode comprises a spinel structure composed of a mildly heated mixture of a ready-made spinel and one or more foreign metal compounds, the foreign metals having atomic number greater than 11; the foreign metal products being distributed on the surface of the spinel structure and not substantially entering the bulk of the spinel structure or substantially extracting lithium from the spinel structure, the surface distributed foreign metal compound reducing capacity fade rate of the battery during cycling at elevated temperature.

We find that the reduced capacity fade rate at elevated temperature is achieved when the ppm amount of $H_2O$ generated per gram of any charged-surface-treated spinel, k, is "substantially less than" the ppm amount of $H_2O$ generated per gram of charged-untreated spinel, $k_o$. Here ppm of $H_2O$ generated in the methanol reaction is defined as $H_2O$ generated ($\mu$g)/methanol (g), which must then be further normalized by the quantity of charged spinel. For our tests we used 1.4 g of methanol per gram of charged spinel. In this case we can quantify the meaning of "substantially less than" by looking at the statistical variance in our data. We have chosen 40 hours at 45° C. as the standard storage condition for determining k, and find that the standard deviation in $k_o$ is about $0.1k_o$ (i.e. 10%). Hence, we expect a substantially reduced capacity fade rate at elevated temperature when $k<0.9k_o$.

The invention is also directed to a method for reducing the capacity fade rate during cycling at elevated temperature of a non-aqueous rechargeable lithium manganese oxide battery, the battery comprising a lithium insertion compound cathode, a lithium compound anode, a separator, a non-aqueous electrolyte including a lithium salt dissolved in a non-aqueous solvent, wherein the lithium insertion compound cathode is formed of a mildly heated mixture of a ready-made spinel and one or more foreign metal compounds, the foreign metals having atomic number greater than 11; the foreign metal products being distributed on the surface of the spinel structure and not entering the bulk of the spinel structure.

At this time, the reason for the capacity fade rate improvement is unclear. Without being adversely bound by theory, but wishing to enable the reader to better understand the invention, a possible explanation is that during moderate temperature heating of ready-made spinel with the foreign metal compounds, foreign metal products form and deposit on the surface of spinel to stabilize the spinel surface. The inventors believe that these foreign metal products are in the form of oxides for the examples presented herein. It is also believed that foreign metal products other than oxides, which also achieve the desired effect may also exist. For the examples that follow, the foreign metal products are hereafter called foreign metal oxides. Moderate heating is necessary to avoid diffusion of foreign metal atoms into the bulk of the spinel, thereby avoiding capacity loss. Therefore, the benefits of the invention might be expected when using certain foreign metal compounds which decompose at moderate temperatures to form foreign metal products on the surface of spinel.

BRIEF DESCRIPTION OF THE DRAWINGS

In drawings which illustrate specific embodiments of the invention, but which should not be construed as restricting the spirit or scope of the invention in any way:

FIG. 8 shows the 40° C. capacity versus cycle number data for the series of $Li_{1+x}Mn_{2-x}O_4$ cathode based 18650 size batteries comprising 350° C. heated aqueous treated $Li_{1+x}Mn_{2-x}O_4$ containing 0, 0.095, 0.19, 0.37, 0.74, or 1.5 mole % Bi.

FIG. 9 shows the 40° C. capacity versus cycle number data for $Li_{1+x}Mn_{2-x}O_4$ cathode based 18650 size batteries, where the cathodes were made from aqueous treated $Li_{1+x}Mn_{2-x}O_4$+1.5 mole % Pb heated at 750° C. These are compared to 18650 size batteries of untreated $Li_{1+x}Mn_{2-x}O_4$.

DETAILED DESCRIPTION OF SPECIFIC EMBODIMENTS OF THE INVENTION

Figure 1:
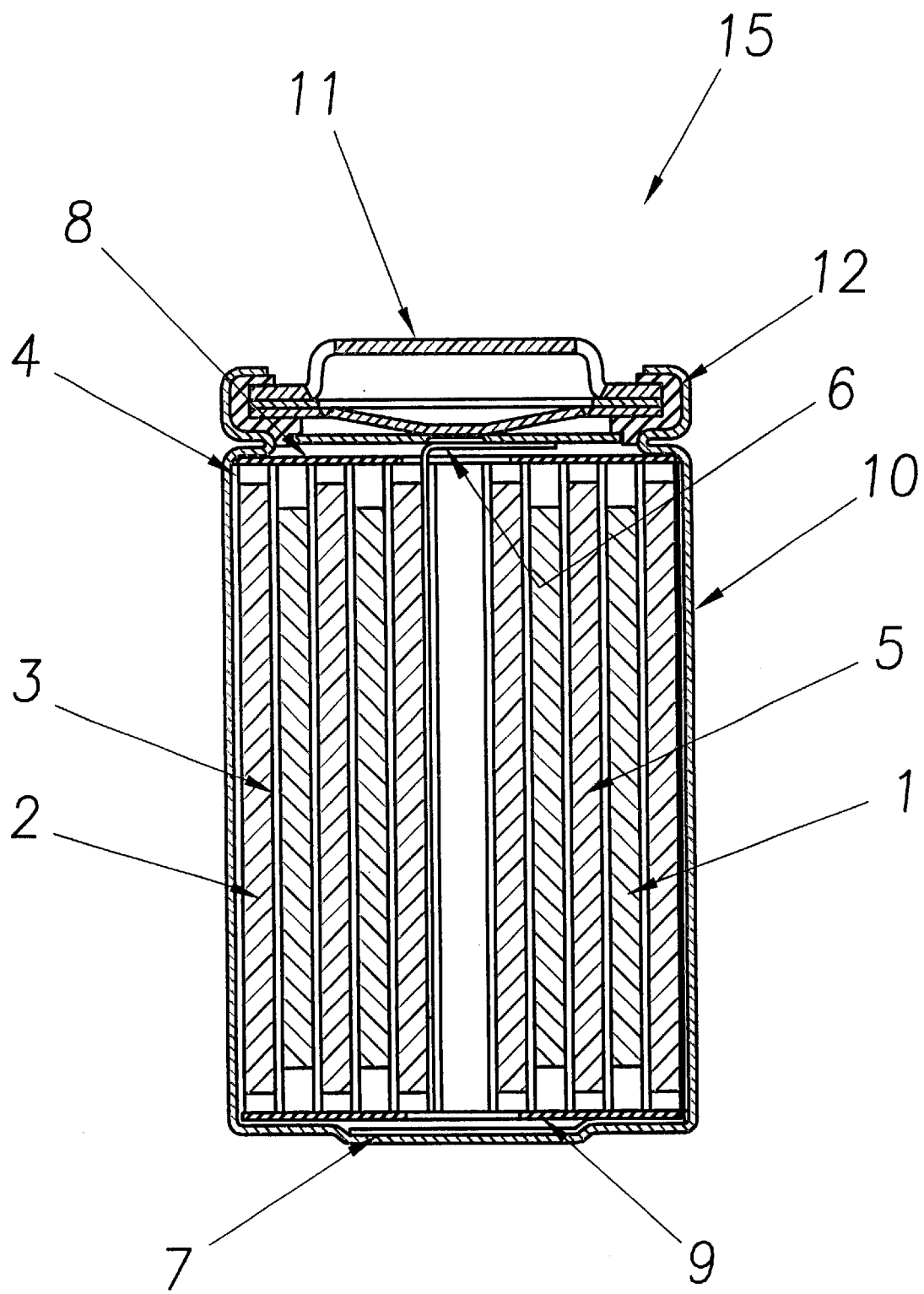
FIG. 1 depicts a cross-sectional view of a preferred embodiment of a cylindrical spiral-wound lithium ion battery.

We have discovered unexpectedly that the spinel capacity fade rate at elevated temperature can be greatly improved by mildly heating a mixture of ready-made spinel with one or more of certain foreign metal compounds to form foreign metal products on the surface of the spinel. Various methods endeavoring to improve the capacity fade rate of spinel, such as doping foreign metals into spinel, have been tried in the art. However, none of these methods show a significant improvement in capacity fade without simultaneously introducing a significant loss in initial capacity. The subject invention is distinct and unique in that a significant improvement in capacity fade is achieved, with only an insignificant corresponding loss in initial capacity caused by the small extra mass of the foreign metal product.

One of the preferred methods for obtaining this cathode powder is simply to dissolve a suitable amount of a certain foreign metal compound into water and then mix it with ready-made spinel powder for less than an hour. Subsequently, the resulting slurry is dried at about 95° C. for an hour, then heated at above the decomposition temperature of the foreign metal compound, and less than or equal to 750° C., for 2 to 4 hours. Preferably the heating temperature is 350° C. This step removes the moisture and forms the desired foreign metal products on the surface of the spinel. This method will henceforth be called aqueous treatment or aqueous treated.

Another preferred method is to dry mix the foreign metal compound with the ready-made spinel, then heat the mixed powders initially at a temperature above the decomposition temperature of the foreign metal compound for about 1 hour, then further heat the mixture to a temperature of about 600° C. and up to 750° C. for 1.5 hours. Hereinafter this method is called dry-mix with heating.

We have also discovered that adding an amount of certain foreign metal compound to the ready-made spinel in the range of 0.01 to less than about 5 mole % of the foreign metal, then heating the mixture can be effective in improving capacity fade rate at elevated temperature. Preferably a small amount of capacity fade reducing foreign metal compound in the range of 0.05 to less than 2 mole % of the foreign metal is employed.

We have also found that not all foreign metals work to improve the capacity fade rate of spinel batteries. Foreign metal compounds that are able to achieve a significant capacity fade improvement comprise either bismuth, lead, lanthanum, barium, zirconium, yttrium, strontium, zinc or magnesium. In particular, the compounds are lead acetate, lead basic carbonate, lead stearate, lead nitrate, bismuth nitrate, bismuth hydroxide, bismuth oxycarbonate, bismuth acetate, bismuth oxide, lanthanum carbonate, lanthanum nitrate, barium nitrate, zirconium di-nitrate oxide, yttrium nitrate, strontium nitrate, zinc acetate and magnesium nitrate. However, any foreign metal compounds that can form a stable product on the surface of spinel without substantially entering the bulk of the spinel structure or extracting substantial Li, can potentially achieve the capacity fade reduction at elevated temperature. It has been further observed that the inventive surface treatments of spinel do not interfere with the normal functioning of the battery.

Typically, the type of battery according to the invention employs lithium manganese oxide ($Li_{1+x}Mn_{2-x}O_4$) as the cathode and either coke or graphite as the anode.

Preferred electrolytes for these lithium manganese oxide batteries comprise $LiPF_6$ salt dissolved in a mixture of non-aqueous organic carbonate solvents (such as ethylene carbonate, propylene carbonate, ethyl methyl carbonate, and/or diethyl carbonate). This choice of salts can result in a safer, more stable, electrolyte than would some other salt choices.

It is important to determine the capacity fade rate as a function of the amount of foreign metal compound used. Some non-inventive characterization trials must thus be performed in order to arrive at a sensible usage of the inventive cathode compounds.

The invention relates to battery constructions with one or more of the aforementioned foreign metal compounds mixed with ready-made spinel and heated at moderate temperatures as the cathode material. Various battery configurations are suitable, including prismatic formats or miniature coin cells. A preferred conventional construction for a lithium ion type product is depicted in the cross-sectional view of a spiral-wound battery in FIG. 1. A jelly roll 4 is created by spirally winding a cathode foil 1, an anode foil 2, and two micro porous polyolefin sheets 3 that act as separators.

Cathode foils are prepared by applying a mixture of either an aqueous-treated or a dry-mixed treated cathode powder material, a binder, and a conductive dilutant onto a thin aluminum foil (typically about 20 microns in thickness).

Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered carbonaceous insertion compound is used instead of the cathode material and thin copper foil (typically about 10 micron thickness) is usually used instead of aluminum. Anode foils are typically slightly wider in width than the cathode foils in order to ensure that anode foil is always opposite cathode foil.

The jelly roll 4 is inserted into a conventional battery can 10. A header 11 and gasket 12 are used to seal the battery 15. The header may include safety devices if desired such as a combination safety vent and pressure operated disconnect device. Additionally, a positive thermal coefficient device (PTC) may be incorporated into the header to limit the short circuit current capability of the battery. The external surface of the header 11 is used as the positive terminal, while the external surface of the can 10 serves as the negative terminal.

Appropriate cathode tab 6 and anode tab 7 connections are made to connect the internal electrodes to the external terminals. Appropriate insulating pieces 8 and 9 may be inserted to prevent the possibility of internal shorting.

Then, prior to crimping the header 11 to the can 10 and sealing the battery, the electrolyte 5 is added to fill the porous spaces in the jelly roll 4.

At this point, the battery is in a fully discharged state. Generally, an electrical conditioning step, involving at least a single complete recharge of the battery, is performed as part of the overall assembly. One of the reasons for so doing is that some initial irreversible processes take place on this first recharge. For instance, a small amount of lithium is irreversibly lost during the first lithiation of the carbonaceous anode.

Advantages of the invention can be achieved using modest amounts of one or more foreign metal compounds. In the examples that follow, desirable results were obtained using certain foreign metal compounds in the range of 0. 1 to 1.875 mole % of the foreign metal. Of course, the smallest amount is preferred since a lighter battery is more desirable.

The following Examples are provided to illustrate certain aspects of the invention but should not be construed as limiting in any way. 18650 size cylindrical batteries (18 mm diameter, 65 mm height) were fabricated as described in the preceding and shown generally in FIG. 1. The inventive spinel cathode powder comprising of $Li_{1+x}Mn_{2-x}O_4$ and foreign metal products will henceforth be referred to as treated spinel powder or $Li_{1+x}Mn_{2-x}O_4$ +elemental foreign metal (given in molar percentage relative to $Li_{1+x}Mn_{2-x}O_4$). The ready-made spinet, $Li_{1+x}Mn_{2-x}O_4$ with x equal to 0.05 and a lattice constant of 8.230 Å, is preferred for reasons of both good initial capacity and good cycle life at 21° C. Therefore, the inventive cathode materials all have this type of ready-made spinel.

Cathodes 1 comprised a mixture of combination metal oxides powder, a carbonaceous conductive dilutant, and polyvinylidene fluoride (PVDF) binder that was uniformly coated on both sides of a thin aluminum foil. Anodes 2 were made using a mixture of a spherical graphitic powder plus Super S (trademark of Ensagri) carbon black and PVDF binder that was uniformly coated on thin copper foil. Celgard 2300® micro porous polyolefin film was used as the separator 3.

The electrolyte 5 employed was a solution of 1M $LiPF_6$ salt dissolved in a solvent mixture of ethylene carbonate (EC), propylene carbonate (PC), ethyl methyl carbonate (EMC) solvents in a volume ratio of 30/10/60 respectively. The choice of $LiPF_6$ salt can result in a safer, more stable electrolyte than would other salt choices.

To protect against hazardous conditions on overcharge of the battery, the header of these batteries included a pressure operated electrical disconnect device.

For electrical testing, batteries were thermostated at 40±1° C. or 45±1° C. Cycling was performed using a current limited (1A), constant voltage charge (4.2 volts) for 2.5 hours and a constant current discharge (1A) to a 2.5 volt cutoff. (Note: For purposes of observing changes in battery impedance, a prolonged, low rate charging or discharging was performed every 20 cycles. Subsequent discharge capacities may then be significantly different from than the previous ones. These points have been omitted from the data presented below for purposes of clarity. However, this type of testing can introduce a noticeable discontinuity in the capacity versus cycle number data curves.)

The data below will show that the inventive treatments yield foreign metal products on the surface of the spinel structure, unlike doped spinel where the foreign metal is embedded in the spinel structure. Samples of the inventive treated spinel cathode powders were prepared as described above. They were then washed in 0.025M EDTA (from ethylene diamine tetra acetic acid disodium salt) and the supernatant was collected and analyzed by ICP-AES (Inductive Coupled Plasma-Atomic Emission Spectroscopy).

A sample of 0.75 mole % Bi treated spinel, prepared as in Example 1I below, was washed in 0.025M EDTA for less than three minutes. The ICP-AES result of the supernatant showed that 3.03%±0.15% spinel (as determined from the amount of dissolved Mn) and 92%±14.5% bismuth dissolved. Therefore, it was evident that most of the bismuth was on the surface.

Similarly, a sample of 0.75 mole % Pb treated spinel, prepared as in Example 1 below, was washed in 0.025M EDTA for less than three minutes. It was found that 1.75%±10.08% spinel and 82%±4.5% lead from the original sample were dissolved. Therefore, most of the lead was on the surface. For comparison, the same spinel and Bi and/or Pb samples were dissolved completely in Aqua Regia (a mixture of concentrated $HNO_3$ and HCL) and their supernatant analyzed by ICP-AES. As expected, the results showed both spinel and Bi and/or Pb had been 100%±2% dissolved from the original sample.

On the other hand, when bismuth doped spinel (spinel synthesized together with 1 mole % Bi as in Example 5 below) was washed in 0.025M EDTA for less than three minutes, the result from ICP-AES showed that the supernatant had 1.57%±0.05% spinel and only 4.6%±1.5% Bi dissolved from the original sample. Therefore, it was evident that most of the bismuth was not on the surface.

To see if the dissolution for both spinel and bismuth could be improved, a sample of the same Bi doped spinel was washed in 0.025M EDTA for a longer period, i.e. fifteen minutes. Once again the ICP-AES result showed only 2.37%±0.07% spinel and 4.6%±1.5% Bi from the original sample were in the supernatant. It was noted that in both instances the same amount of bismuth was dissolved. While the inventors do not wish to be adversely bound by any theory, it is thought that since bismuth is embedded in the structure of spinel during synthesis, the amount of bismuth available for dissolution in EDTA is limited, that is, bismuth that is readily close to the surface of the doped spinel would be the only bismuth to be dissolved.

The above dissolution analysis demonstrates that the foreign metals of the inventive cathode powders are located on the surface of spinel and the foreign metals in the doped spinel cathode powders are embedded in the spinel structure. This distinction is crucial, because as we have discovered and will show, the former configuration improves fade, and the latter does not.

In the examples that follow, the inventors believe the foreign metal products are in the form of oxides, but other products may also exist. For simplicity, the foreign metal products in the examples are hereafter known as foreign metal oxides. For each of the examples below one distinct batch of ready-made spinel powder was used to prepare all the treated spinel powders described within that example and for the control cells containing untreated spinel. Different examples may use different batches of ready-made spinel.

Example I

Spinel 18650 Batteries with Different Foreign Metal Oxides in the Cathode

A series of spinel batteries were constructed with the same components except for their cathodes. The cathodes comprised 350° C.-aqueous treated spinel powders: $Li_{1+x}Mn_{2-x}O_4$, $Li_{1+x}Mn_{2-x}O_4$+Mo(0.75 mole %), $Li_{1+x}Mn_{2-x}O_4$+Pb (0.75 mole %), and $Li_{1+x}Mn_{2-x}O_4$+Bi(0.36 mole %). The foreign metal compounds used were $(NH_4)_6Mo_7O_{24}.4H_2O$ $Pb(C_2H_3O_2)_2.3H_2O$, $Bi(NO_3)_3.5H_2O$. Each cathode powder material was prepared by first dissolving the foreign metal compound in 0.4 mL of water per gram of ready-made spinel, then adding the spinel powder to the solution. Next the mixture was dried at about 95° C. for an hour, then heated in a furnace (Thermcraft Incorporated) at 350° C. for 2 hours under extra dry air, the furnace having a ramping rate of 10 to 15° C./minute. The cathode powder was then allowed to cool slowly until reaching below 100° C. It was then used to make the lithium ion batteries, which were cycled at 40° C. as described above.

Figure 2:
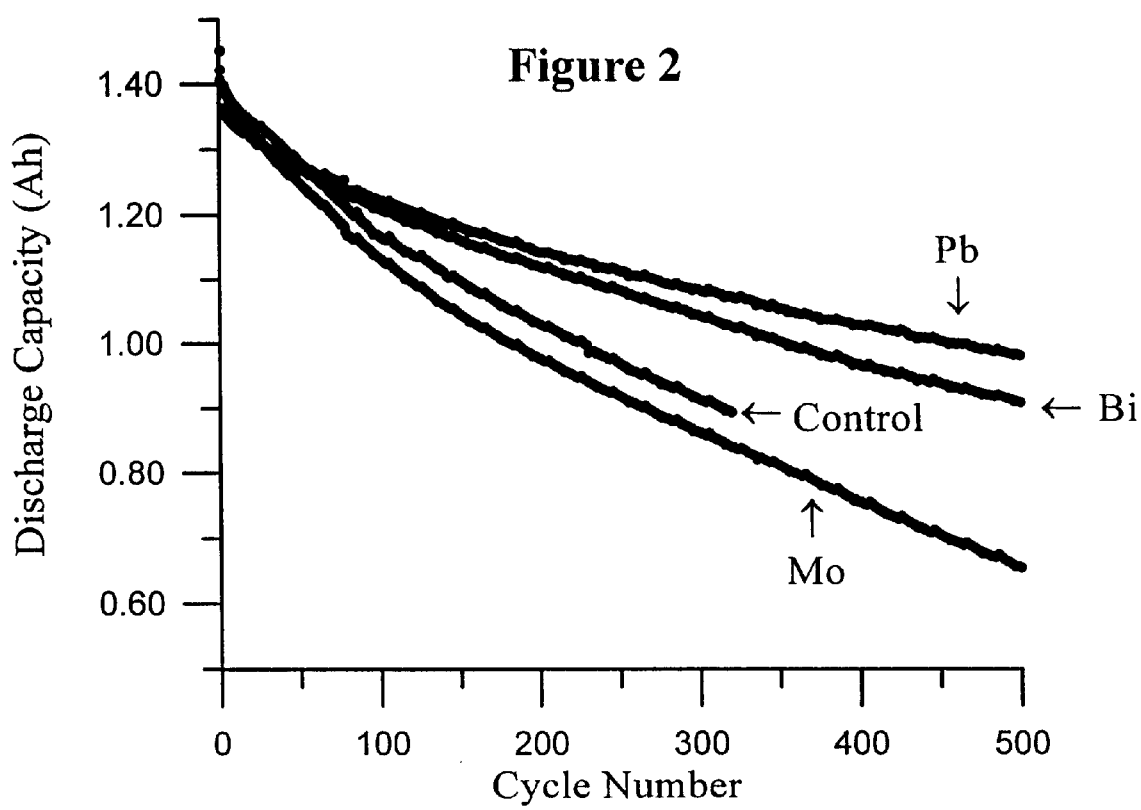
FIG. 2 shows the 40° C. capacity versus cycle number data for a series of $Li_{1+x}Mn_{2-x}O_4$ cathode based 18650 size batteries, applying the inventive aqueous treatment to obtain spinel cathode materials treated with Mo, Pb, or Bi.

FIG. 2 shows the capacity versus cycle number data for these batteries. The capacity fade of spinel with either Pb or Bi oxides was greatly improved at elevated temperature compared to the control. However, the battery with Mo in the cathode shows worse capacity fade than the control. This indicates that not all foreign metal oxides in combination with $Li_{1+x}Mn_{2-x}O_4$ will give improved elevated temperature cycle life.

Figure 3:
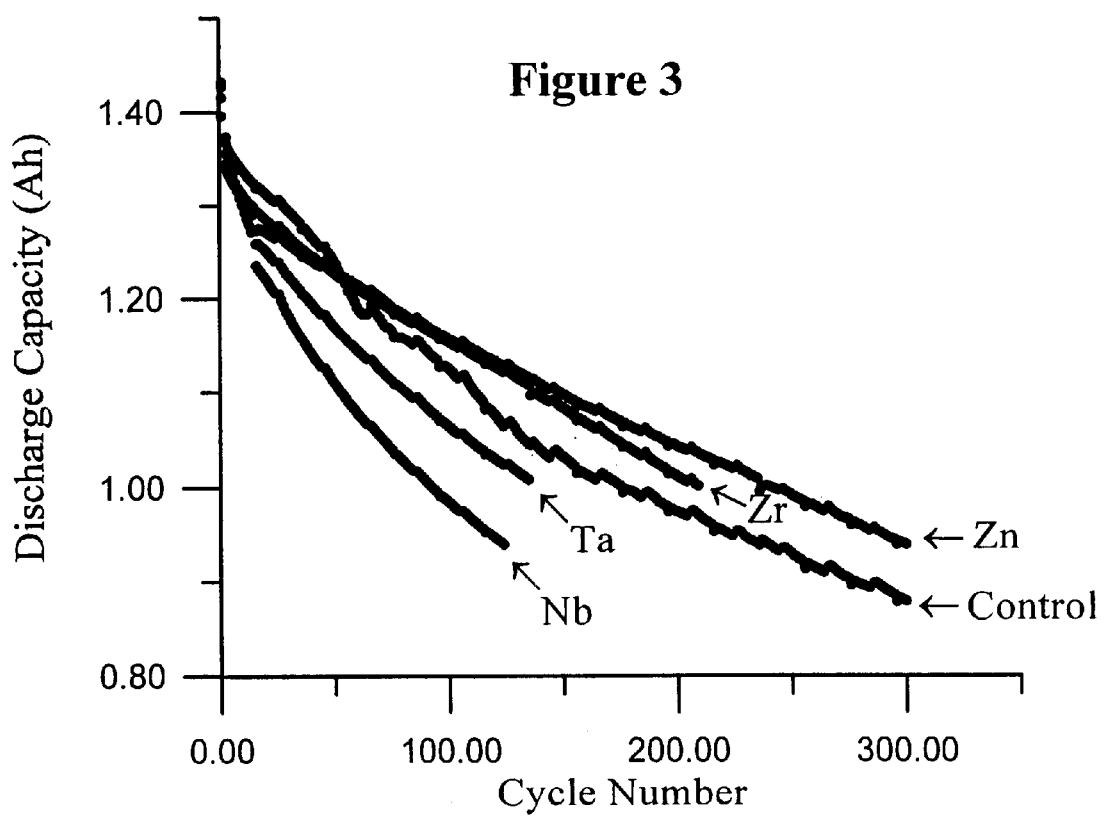
FIG. 3 shows the 40° C. capacity versus cycle number data for the series of $Li_{1+x}Mn_2O_4$ cathode based 18650 size batteries, applying the inventive aqueous treatment to obtain spinel cathode materials treated with Zn, Zr, Nb, or Ta.

Therefore, four additional foreign metal oxides were prepared by aqueous treatment at 350° C. as described above, except this time the foreign metal compound was dissolved in 0.3 mL of water per gram of ready-made spinel. Once again, cathodes with these foreign metal oxides were assembled as 18650 batteries and cycled at 40° C. FIG. 3 shows the capacity versus cycle number data for batteries of cathodes with $Li_{1+x}Mn_{2-x}O_4$, $Li_{1+x}Mn_{2-x}O_4$+Zn(0.8 mole %), $Li_{1+x}Mn_{2-x}O_4$+Zr(0.375 mole %), $Li_{1+x}Mn_{2-x}O_4$+Nb (0.374 mole %), and $Li_{1+x}Mn_{2-x}O_4$+Ta(0.352 mole %). The corresponding foreign metal compounds were $Zn(C_2H_3O_2)_2.2H_2O$, $ZrO(NO_3)_2.xH_2O$, $NbCl_5$, and $TaCl_5$ It was found that Zn and Zr improved the cycle life of spinel at elevated temperature. On the other hand, Nb and Ta did not.

Figure 4:
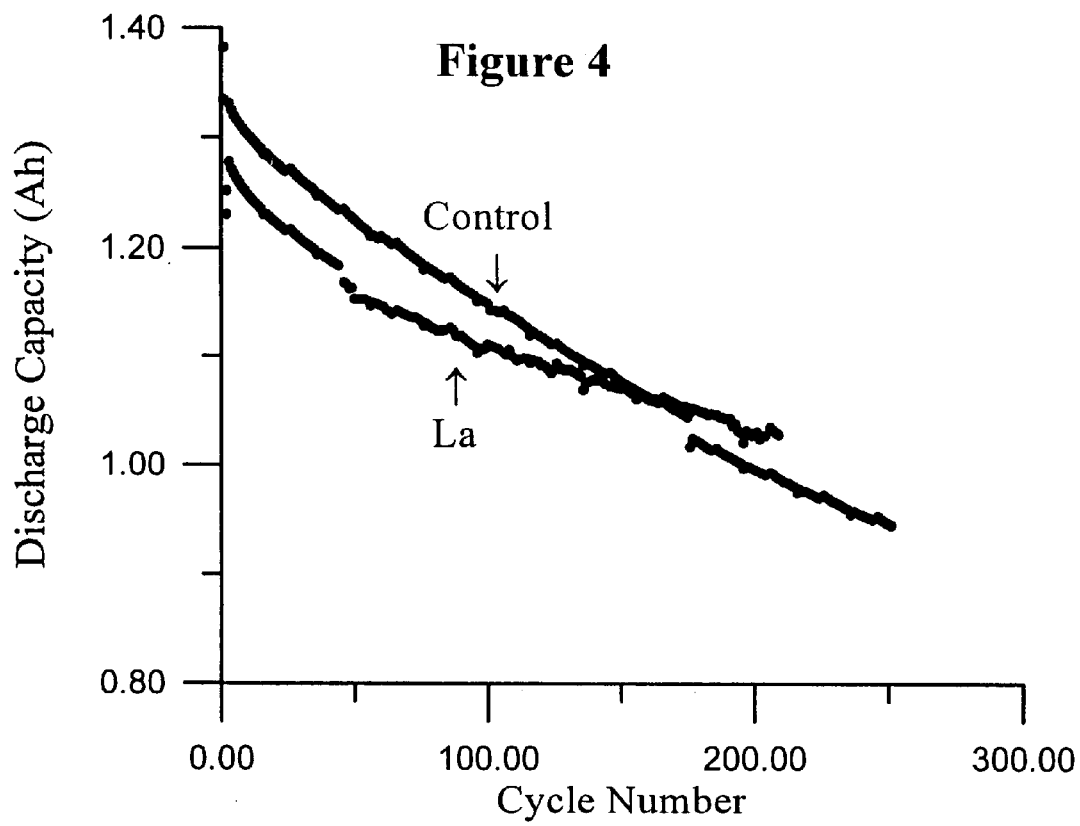
FIG. 4 shows the 45° C. capacity versus cycle number data for the series of $Li_{1+x}Mn_{2-x}O_4$ cathode based 18650 size batteries, applying the inventive aqueous treatment to obtain spinel cathode materials treated with La.

Similarly FIG. 4 shows batteries with $Li_{1+x}Mn_{2-x}O_4$+La (0.75 mole %), which was prepared made by aqueous treatment at 350° C. as described earlier, except the foreign metal compound was dissolved in 0.3 mL of water per gram of ready-made spinel. The foreign metal compound here was $La(ClO_4)_3$. These batteries were cycled at 45° C. as described above.

La-containing batteries had better capacity fade at elevated temperature than the control.

These three examples show surface treated $Li_{1+x}Mn_{2-x}O_4$ with oxides containing Zn, Zr, La, Pb, or Bi are capable of reducing the capacity fade rate of spinel batteries at elevated temperature.

Example II

Spinel 18650 Batteries with Inventive Cathodes Made by the Dry-mix Treatment A series of spinel 18650 batteries were constructed with the same components except for their cathodes. The cathodes comprised of 600° C. dry-mix treated spinel powders: $Li_{1+x}Mn_{2-x}O_4$, $Li_{1+x}Mn_{2-x}O_4$+La(0.75 mole %), $Li_{1+x}Mn_{2-x}O_4$+Pb(0.75 mole %), and $Li_{1+x}Mn_{2-x}O_4$+Bi (0.75 mole %). The foreign metal compounds used were $La(NO_3)_3.6H_2O$, $(PbCO_3)_2.Pb(OH)_2$, and $Bi(NO_3)_3.5H_2O$. Each cathode powder material was prepared by blending the foreign metal compound with the ready-made spinel for about 20 to 30 minutes. The blended powder is then heated in a furnace (Thermcraft Incorporated) under extra dry air at 200° C. for 1 hour, the furnace having a ramping rate of 2° C./min. The blended powder is further heated at 600° C. for an additional 1.5 hours. The cathode powder was then allowed to cool slowly until reaching below 100° C. It was then used to make the lithium ion batteries, which cycled at 45° C. as described above.

Figure 5:
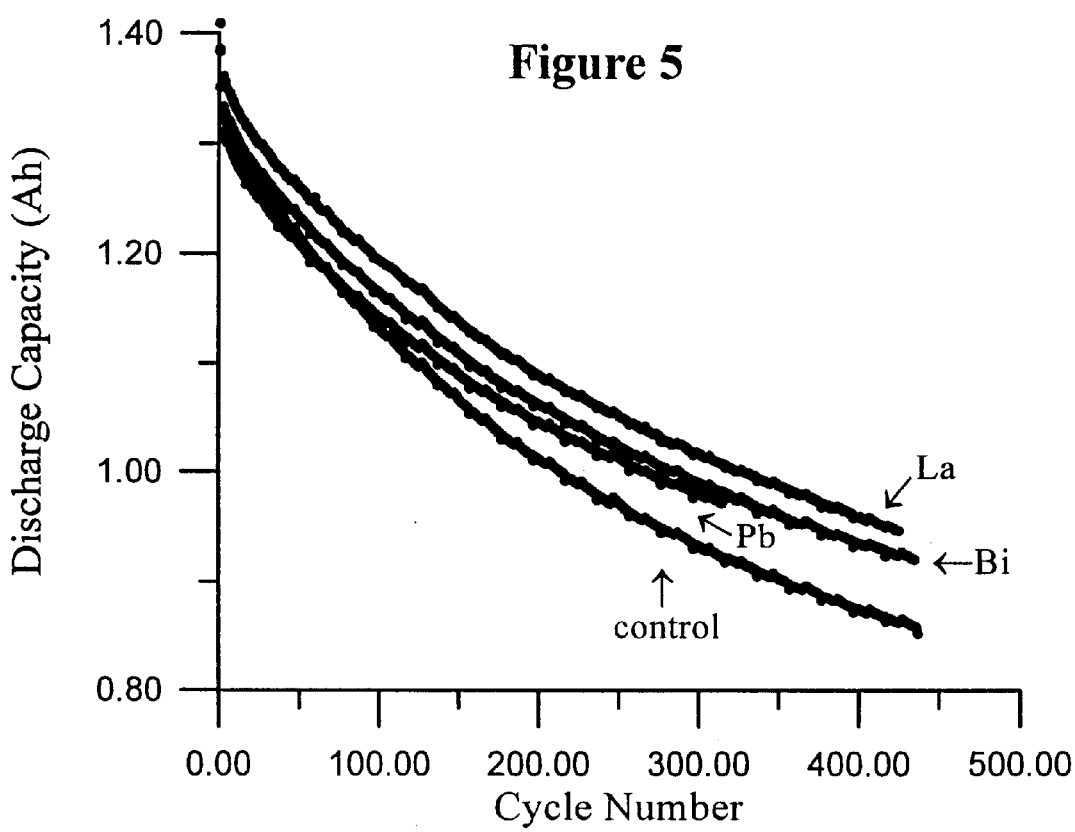
FIG. 5 shows the 45° C. capacity versus cycle number data for the series of $Li_{1+x}Mn_{2-x}O_4$ cathode based 18650 size batteries, applying the inventive dry-mix method to obtain spinel cathode materials treated with La, Pb or Bi.

The batteries containing La, Pb or Bi improved in capacity fade rate compared to the control batteries as illustrated in FIG. 5.

Figure 6:
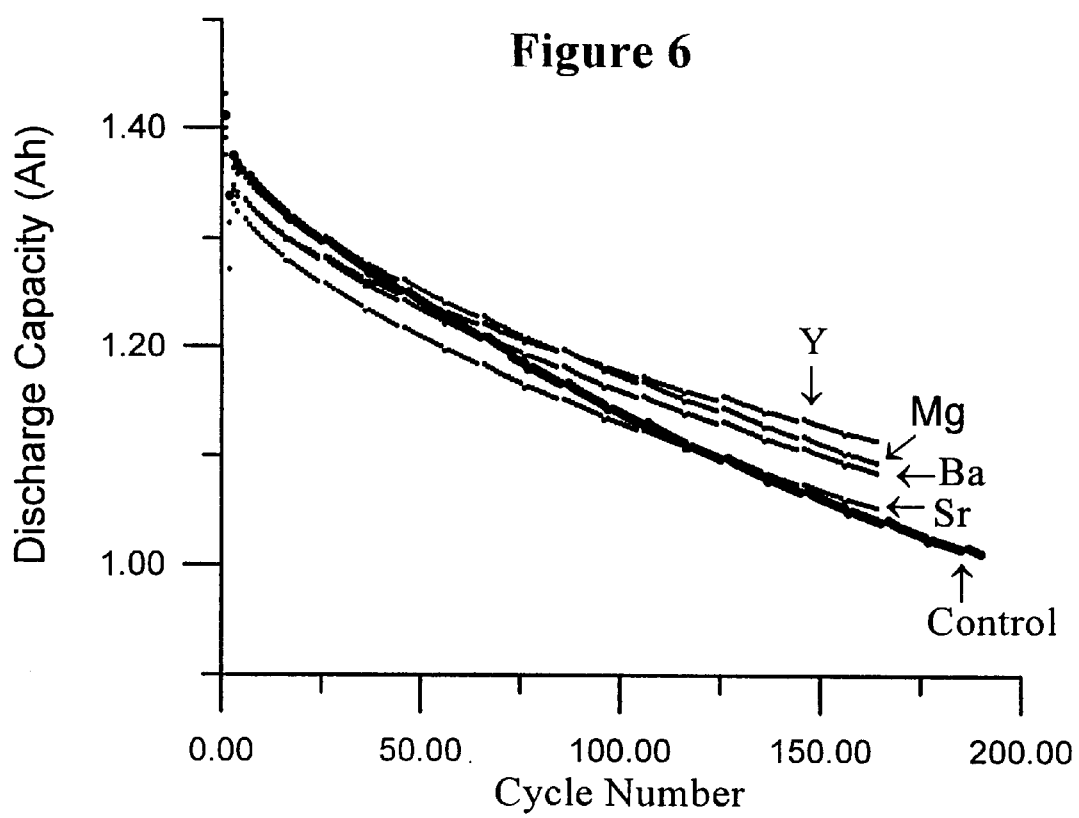
FIG. 6 shows the 45° C. capacity versus cycle number data for the series of $Li_{1+x}Mn_{2-x}O_4$ cathode based 18650 size batteries, applying the inventive dry-mix method to obtain spinel cathode materials treated with Mg, Sr, Y or Ba. These are some more of the foreign metals that also reduce the capacity fade rate of spinel at elevated temperature.

FIG. 6 shows improved capacity fade rate of spinel 18650 batteries with cathodes made from $Li_{1+x}Mn_{2-x}O_4$, $Li_{1+x}Mn_{2-x}O_4$+Mg (1.5 mole %), $Li_{1+x}Mn_{2-x}O_4$+Sr (1.5 mole %), $Li_{1+x}Mn_{2-x}O_4$+Y (1.5 mole %) and $Li_{1+x}Mn_{2-x}O_4$+Ba (1.5 mole %). Each cathode powder material was prepared by blending the foreign metal compound with the ready-made spinel for about 20 to 30 minutes. The blended powder is then heated in a furnace (Thermcraft Incorporated) under extra dry air at 200° C. for 1 hour, the furnace having a ramping rate of 2° C./min. The blended powder is further heated at 600° C. for an additional 1.5 hours. The cathode powder was then allowed to cool slowly until reaching below 100° C. It was then used to make the lithium ion batteries, which cycled at 45° C. as described above. The foreign metal compounds used were nitrates of Mg, Sr, Y or Ba. Batteries with Mg, Sr, Y or Ba showed better fade than the control batteries at elevated temperature.

Examples I and II show that both the aqueous and the dry-mix spinel treatments improve the capacity fade rate of spinel batteries at elevated temperature. These spinel batteries contained Bi, Pb, La, Ba, Zr, Y, Sr, Zn or Mg.

Example III

Figure 7:
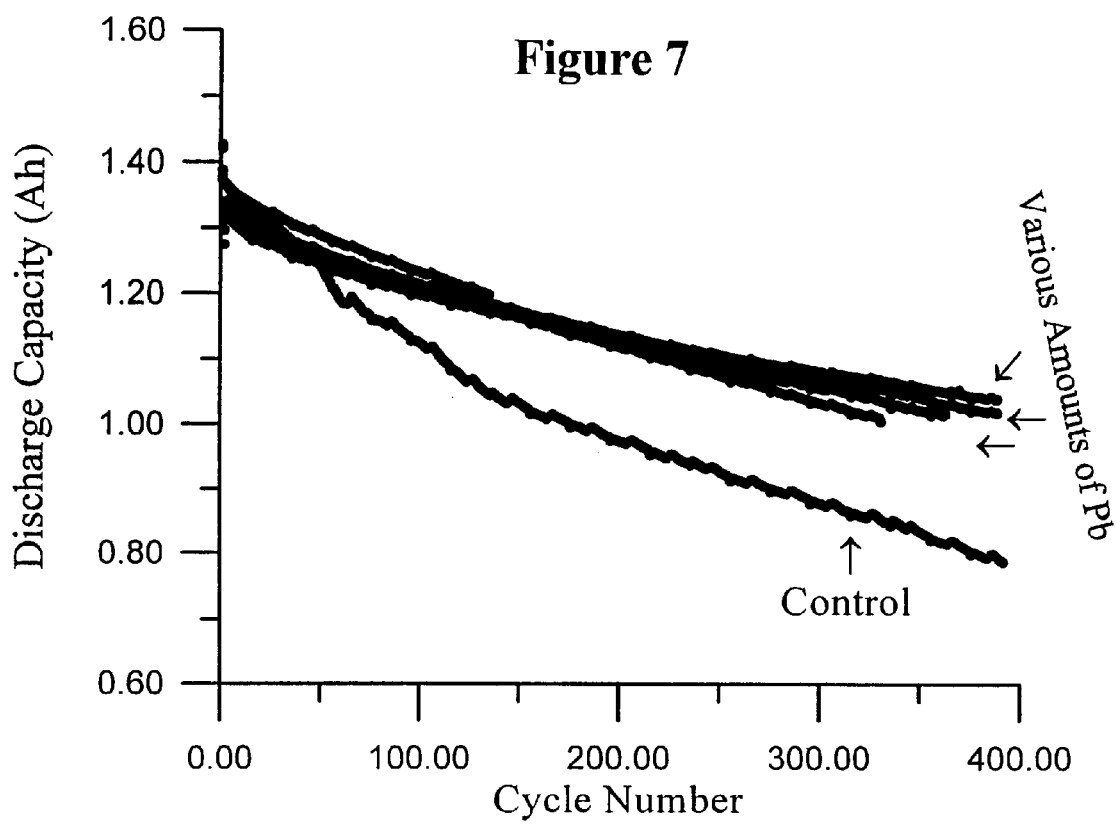
FIG. 7 shows the 40° C. capacity versus cycle number data for the series of $Li_{1+x}Mn_2O_4$ cathode based 18650 size batteries comprising 350° C. heated aqueous treated $Li_{1+x}Mn_2O_4$ containing 0, 0.1, 0.375, 0.75, 1.125, or 1.875 mole % Pb.

Spinel 18650 Batteries with Different Amounts of Foreign Metal Oxides in the Cathode Two series of 350° C., aqueous treated spinel cathodes for 18650 batteries were constructed having various amounts of either Bi or Pb oxides. The two sets of cathode powders were prepared in a like manner as in Example I, except this time the foreign metal compound was dissolved in 0.5 mL of water per gram of ready-made spinel using either $Bi(NO_3)_3.5H_2O$ or $Pb(C_2H_3O_2)_2.3H_2O$ as the precursor foreign metal compound. One of the series had $Li_{1+x}Mn_{2-x}O_4$+Pb with amounts ranging from 0 to 1.875 mole %, and the other series had $Li_{1+x}Mn_{2-x}O_4$+Bi with amounts ranging from 0 to 1.5 mole %. The batteries were then cycled at 40° C. as described above. FIGS. 7 and 8 show respectively the capacity versus cycle number data for batteries with Pb and with Bi.

In FIG. 7, all cells containing Pb are shown to perform about the same with respect to each other, but better than the control. In FIG. 8, the batteries containing Bi are shown with a spread of capacity fade rate with respect to each other. This is attributed to the fact that the precursors of Bi are more difficult to dissolve uniformly in water. Nonetheless, the capacity fade rates of the battery containing Bi oxides are still improved over that of the control battery.

These two examples illustrate that to improve the capacity fade rate of spinel at elevated temperature, any amount of Pb or Bi within the tested range gives reduced fade, that is, all the batteries seem to perform well relative to the untreated control batteries. Therefore, it is preferable to use a minimum amount of foreign metal in order to maximize the battery capacity.

Example IV

Figure 10:
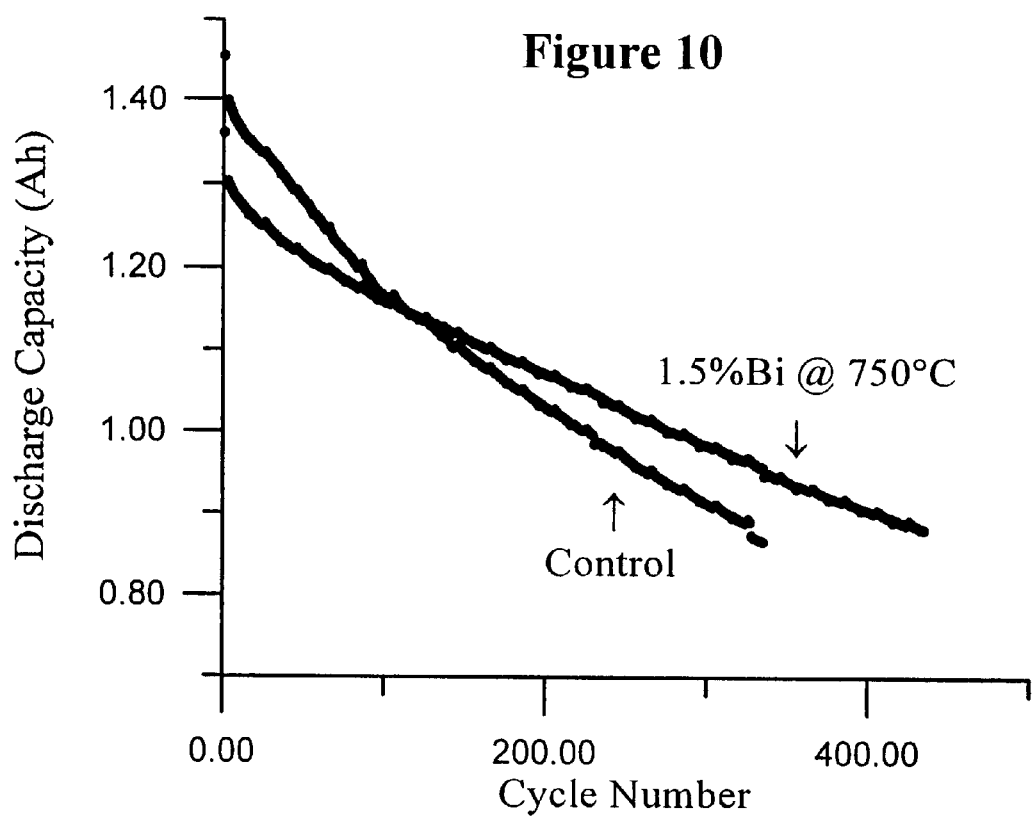
FIG. 10 shows the 40° C. capacity versus cycle number data for $Li_{1+x}Mn_{2-x}O_4$ cathode based 18650 size batteries, where the cathodes were made from dry-mix treated $Li_{1+x}Mn_{2-x}O_4$+1.5 mole % Bi heated at 750° C. These are compared to 18650 size batteries of untreated $Li_{1+x}Mn_{2-x}O_4$.

Spinel 18650 Batteries with Higher Heating Temperatures for both the Aqueous Treated and the Dry-mix Cathode Materials A sample of $Li_{1+x}Mn_{2-x}O_4$+Pb(1.5 mole %), Pb from $Pb(C_2H_3O_2)_2.3H_2O$, was obtained by aqueous treatment similarly as described in Example I, except this time the foreign metal compound was dissolved in 0.5 mL of water per gram of ready-made spinel, the heating temperature used here was 750° C. instead of 350° C. and the powder mixture was heated at 750° C. for four hours. The powder was then used as cathode material for 18650 batteries and cycled at 40° C. as described above. FIG. 9 shows the capacity fade rate of these batteries were better compared to control. Similarly, batteries with $Li_{1+x}Mn_{2-x}O_4$+Bi(1.5 mole %), Bi from $Bi(NO_3)_3.5H_2O$, was prepared by using the dry-mix method as described in Example II, except the blended powder is heated in extra dry air at 750° C. for four hours. 18650 batteries were constructed with cathodes having the dry-mix spinel treated powder, and cycled at 40° C. as described above. FIG. 10 shows these batteries also had better capacity fade than the control.

These two examples indicate that precursors heated at 750° C. (as opposed to heating at 350° C. or 600° C.) by either the aqueous treatment or by the dry-mix treatment also improved the capacity fade of spinel at elevated temperature.

Comparative Example I

Spinel 18650 Batteries with Prior Art Cathode Material and Method

Two sets of Bi doped spinel with either 0.3% or 1% molar bismuth, relative to spinel, were synthesized. A mixture of EMD-$MnO_2$, $Li_2CO_3$ and $Bi_2O_3$ was heated at 750° C. for 4 hours, remixed, then again heated at 750° C. for a further 12 hour period. For control, the ready-made spinel was used.

Figure 11:
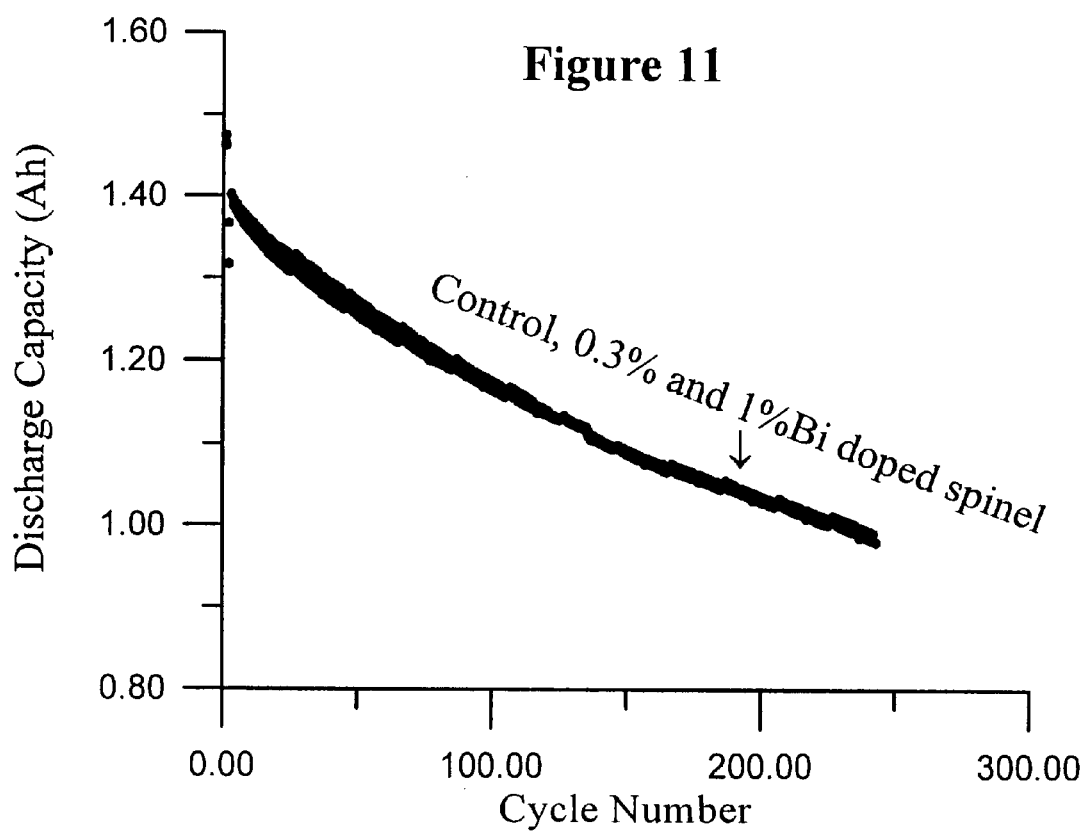
FIG. 11 shows the 40° C. capacity versus cycle number data for the series of spinel cathode based 18650 size batteries, where the cathodes were made from spinel doped with either 0.3 or 1 mole % Bi during synthesis of $Li_{1+x}Mn_{2-x}O_4$. Note that the data for batteries with 0.3 and 1 mole % Bi doped in spinel and untreated spinel overlap and cannot be distinguished in this figure.

The three different cathode materials were then used to construct 18650 batteries with the same components, except for their cathodes. They were all cycled at 40° C. as described above. FIG. 11 shows that bismuth doped spinel has the same fade rate as the undoped spinel. No improvement in the capacity fade rate was observed.

Figure 12:
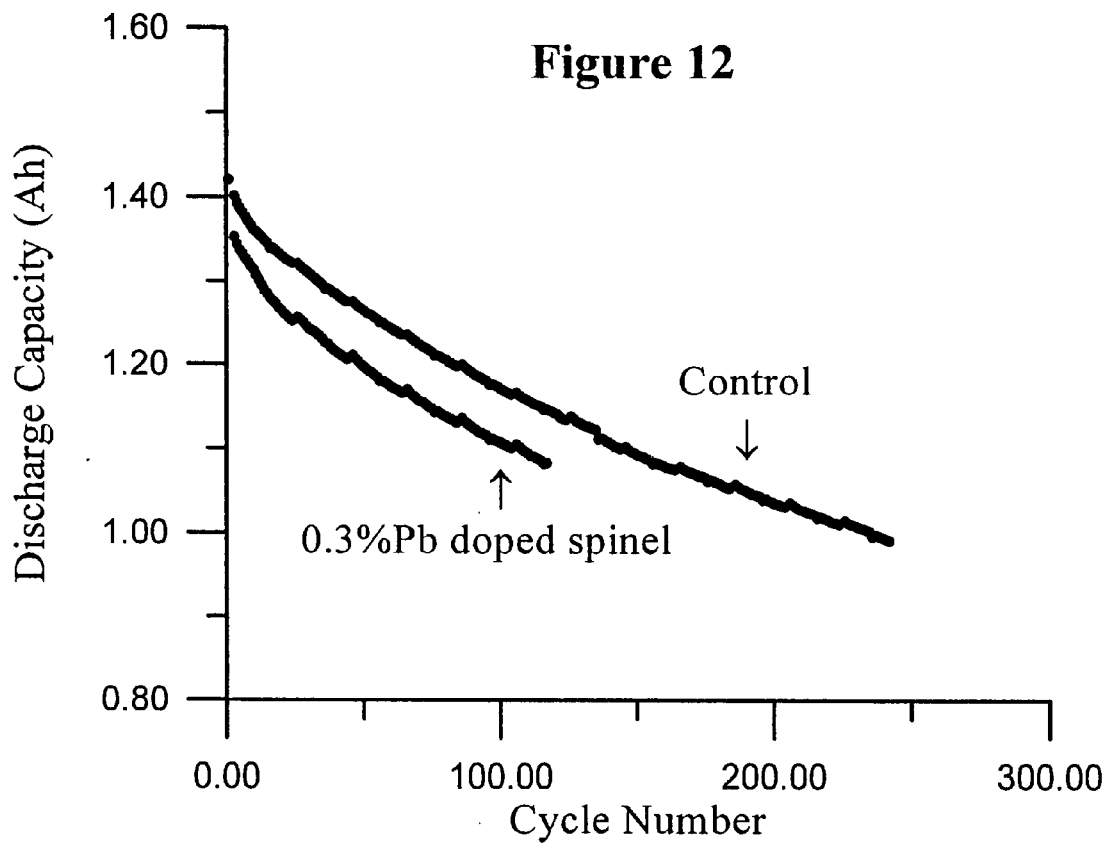
FIG. 12 shows the 40° C. capacity versus cycle number data for the series of spinel cathode based 18650 size batteries, where the cathodes were made from spinel doped with 0.3 mole % Pb in spinel during synthesis of $Li_{1+x}Mn_{2-x-y}Pb_yO_4$.

Similarly, Pb doped spinel with 0.3% molar lead, relative to spinel, was also synthesized in the same manner as the Bi-doped spinel, except the precursors were EMD-$MnO_2$, $Li_2CO_3$. and $Pb(C_2H_3O_2)_2 \cdot 3H_2O$. Two 18650 batteries with 0.3% molar Pb-doped spinel were constructed and cycled at 40° C. as shown in FIG. 12. Once again, there was not any improvement in the capacity fade rate.

This comparative example shows that spinel lithium ion batteries with either Bi or Pb doped spinel did not improved the capacity fade rate of the spinel batteries at elevated temperature.

Comparative Example II

Spinel 18650 Batteries with Prior Art Cathode Material and Method

Figure 13:
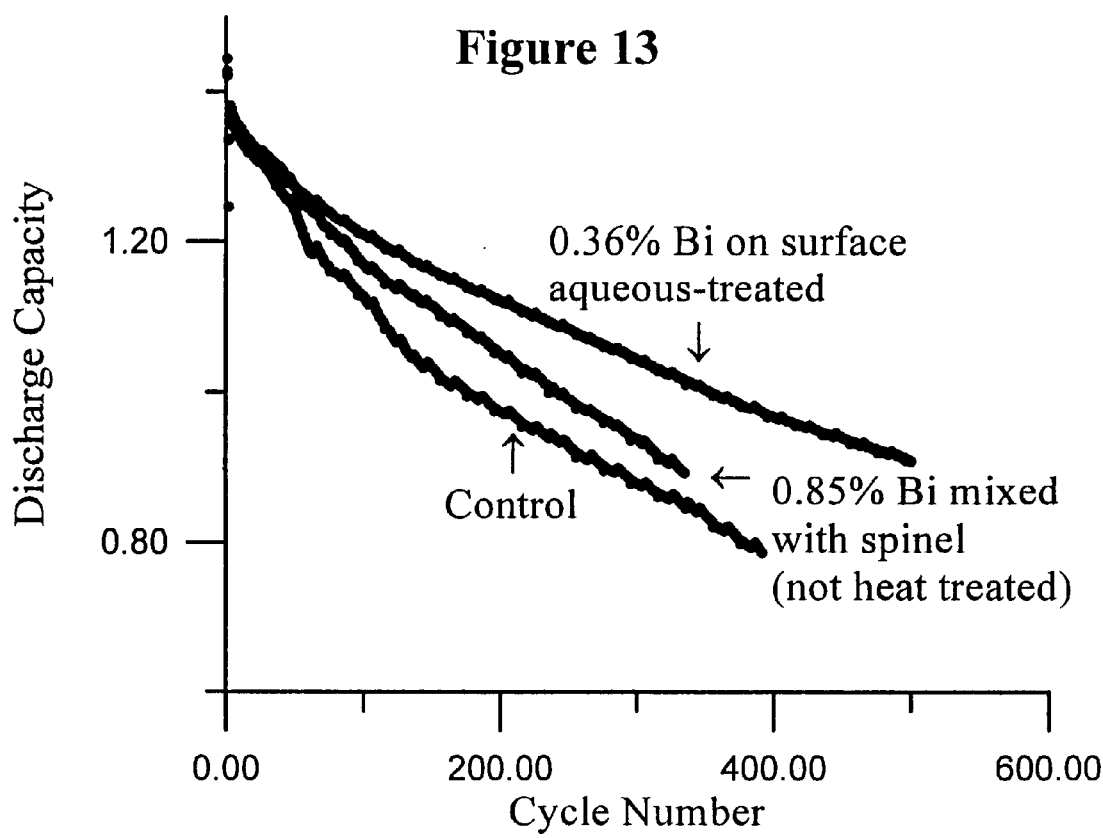
FIG. 13 shows the 40° C. capacity versus cycle number data for the series of $Li_{1+x}Mn_{2-x}O_4$ cathode based 18650 size batteries, where the cathodes were made from ready-made spinel mixed with 1% $Bi_2O_3$ by weight (equivalent to 0.85% mole Bi) without heating. This is compared to the aqueous treated $Li_{1+x}Mn_{2-x}O_4$+0.36 mole % Bi batteries.

Another two 18650 batteries were prepared using cathodes comprising a mixture of ready-made spinel and 1% by weight of $Bi_2O_3$ relative to spinel (equivalent to 0.85% mole Bi), where the blended powder was not heated. The batteries were cycled at 40° C. as described above. As shown in FIG. 13, the capacity fade rate of these batteries were no better than the control battery. For comparison, 18650 batteries with cathodes made from aqueous treated $Li_{1+x}Mn_{2-x}O_4$+ Bi(0.36 mole %), as prepared in Example I is also shown in FIG. 13. The aqueous-treated spinel batteries have better capacity fade than either the control or the spinel blended with $Bi_2O_3$ without-heating-batteries.

This comparative example shows that the mixture of ready-made spinel and $Bi_2O_3$ without heating did not improved the capacity fade rate of the spinel batteries at elevated temperature.

Example V

Correlation Between Lithium Ion Battery Capacity Fade Rate and Methanol Oxidation Rate As described earlier, small amounts of methanol and ethanol are always present in lithium ion batteries, due to the chemical composition of the anode SEI layer. The oxidation of the alcohols at the charged cathode is believed to be the root cause of capacity fade during cycling at elevated temperatures. Without being bound by theory, the reaction is believed to be:

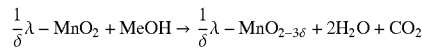

$$\frac{1}{\delta}\lambda - MnO_2 + MeOH \rightarrow \frac{1}{\delta}\lambda - MnO_{2-3\delta} + 2H_2O + CO_2$$

Figure 14:
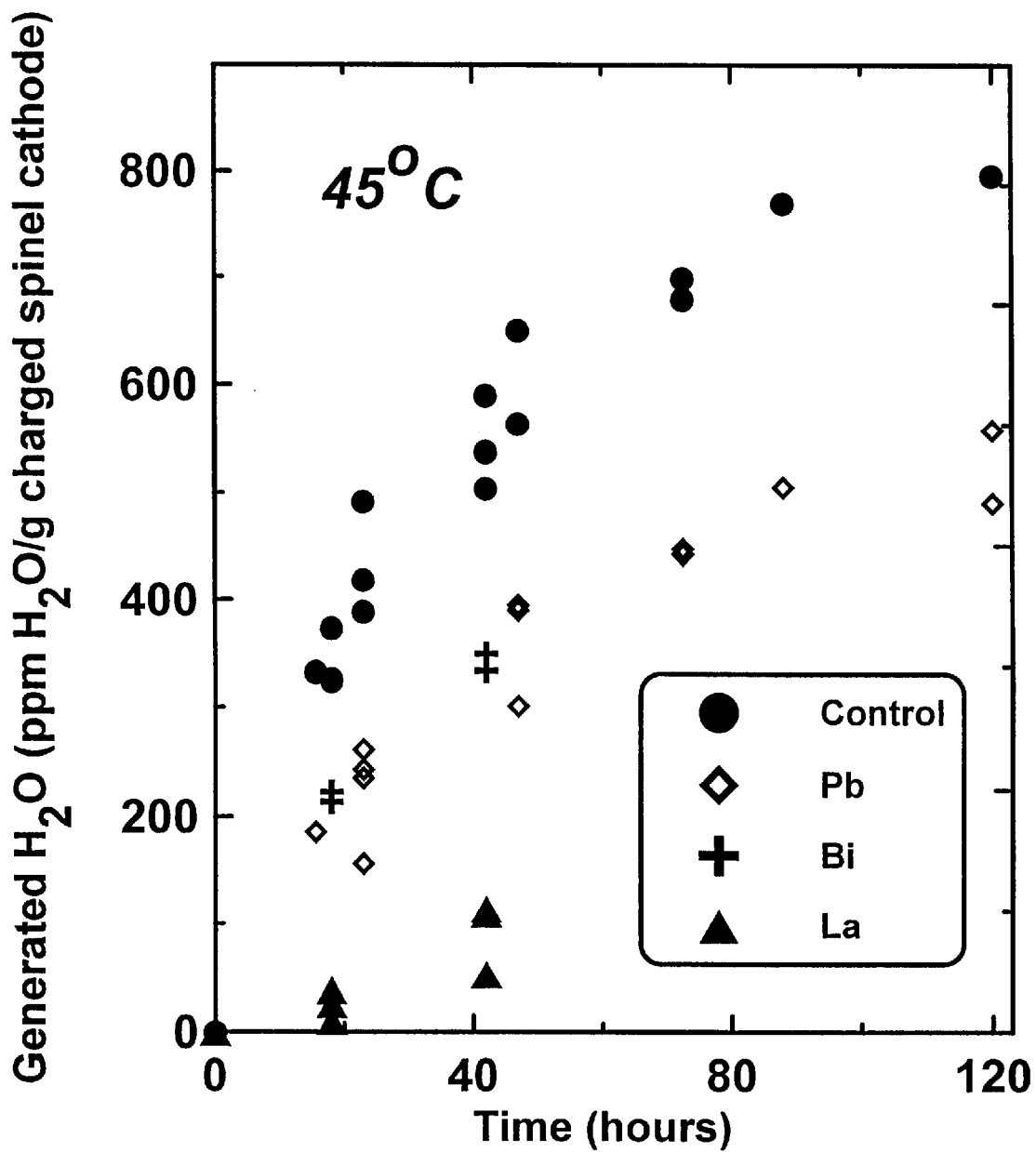
FIG. 14 shows the time dependence of the amount of $H_2O$ generated when various charged (de-lithiated) spinels, are submerged in methanol at 45° C. We see that untreated spinel generates much more $H_2O$ than Bi or Pb treated spinel, and that La treated spinel generates by far the least amount of $H_2O$.
Figure 15:
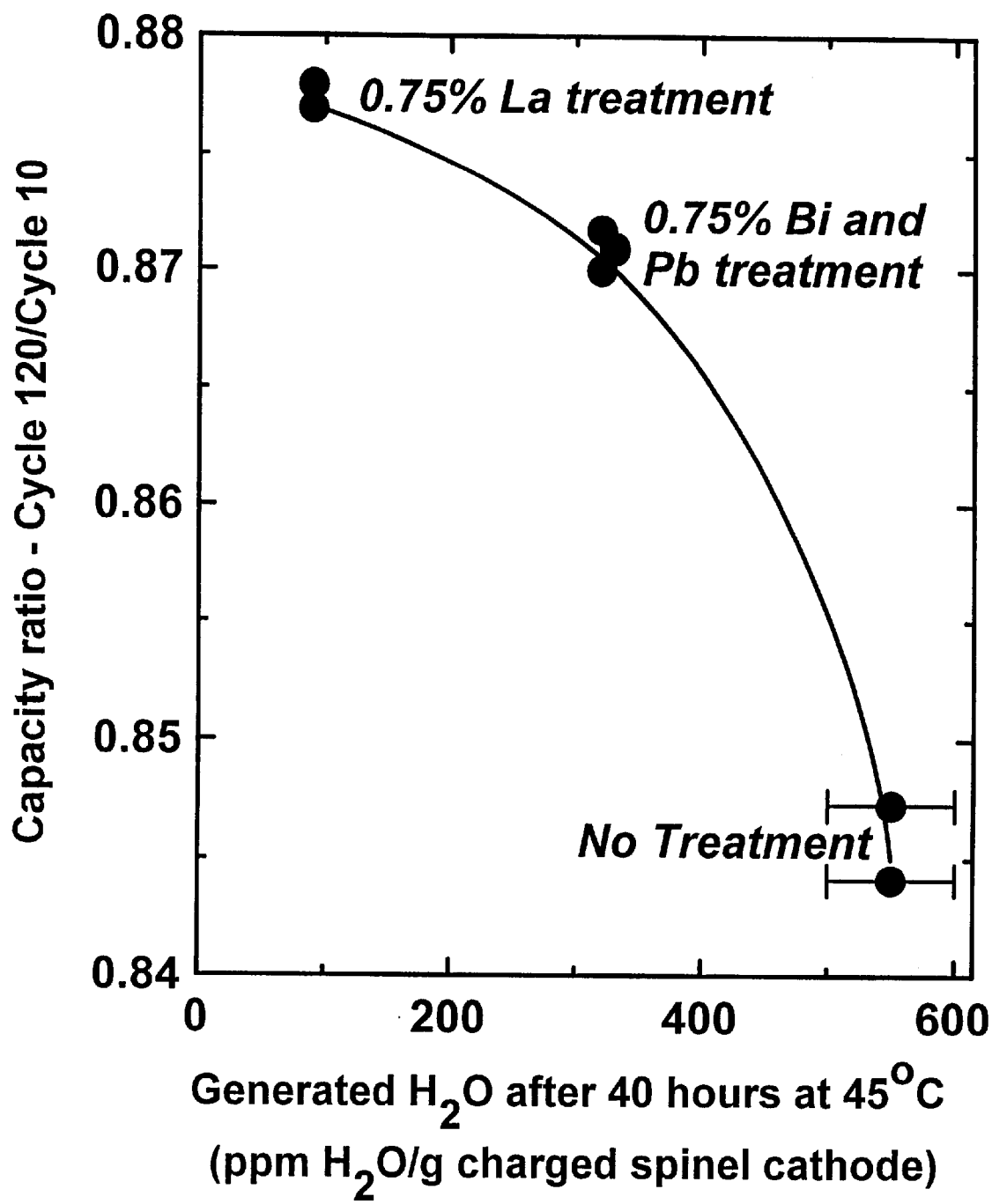
FIG. 15 shows the clear correlation between capacity fade at 45° C. in a spinel lithium-ion battery and the amount of $H_2O$ generated when the corresponding type of charged (de-lithiated) cathode is submerged in methanol for 40 hours at 45° C.

This reaction rate can be measured by removing the cathode from a charged spinel lithium ion battery, rinsing it in dimethyl carbonate and then submersing it in methanol at 45° C. to monitor the generation of $H_2O$ as a function of time. Promptly after submerging the $\lambda$-$MnO_2$, a background moisture reading is taken, which is then subtracted from all subsequent readings. The background moisture arises mostly from $H_2O$ adsorbed on the surface of the $\lambda$-$MnO_2$. FIG. 14 shows the $H_2O$ generation rate as a function of time in methanol at 45° C. for various de-lithiated spinel cathodes. The data clearly show that the water generation rate follows the sequence no- treatment>Pb-treatment>Bi-treatment>La-treatment. FIG. 15 makes a direct connection between the water generation rate after 40 hours at 45° C. and the capacity fade rate in spinel lithium-ion batteries. Here we chose to quantitatively characterize fade rate by taking the ratio of the observed battery capacities after 10 and 120 cycles at 45° C. When cycle 120/cycle 10 is small the capacity fade rate is higher. These data show that any foreign metal treatment of spinel, such as described in this disclosure, which reduces the water generation rate of the treated $\lambda$-$MnO_2$, can be expected to have improved capacity fade in a lithium-ion battery.

The ppm of $H_2O$ generated in the methanol reaction referred to in FIGS. 14 and 15 is defined as $H_2O$ generated ($\mu$g)/methanol (g), which must be further normalized by the quantity of charged spinel. For our tests we used 1.4 g of methanol per gram of charged spinel. The error bars in FIG. 15 represent the standard deviation obtained from the five control samples in FIG. 14, about 40 hours after the methanol reaction at 45° C. Accordingly,. we define k to be the ppm amount of $H_2O$ generated per gram of charged-treated spinel in methanol after 40 hours at 45° C. and $k_o$ to be the ppm amount of $H_2O$ generated per gram of charged-untreated spinel in methanol after 40 hours at 45° C. Therefore, if $k/k_o<0.9$ (one minus one standard deviation of the control samples), then a significantly improved fade rate at elevated temperature is obtained for the lithium manganese oxide battery with that cathode.

The preceding examples demonstrate that not all foreign metal oxides on the surface of $Li_{1+x}Mn_{2-x}O_4$ can effectively reduce capacity fade rates at elevated temperature. However, we have discovered Bi, Pb, La, Ba, Zr, Y, Sr, Zn, and Mg are capable of greatly improving the capacity fade rate of lithium manganese oxide batteries at elevated temperatures, in particular Bi, Pb, La and Y. Furthermore, as shown in the examples, not all methods of introducing the foreign metals in the spinel cathode can achieve the results obtained from the inventive compounds and methods. We have also demonstrated the correlation between slowing down the methanol reaction rate of the charged or de-lithiated spinel ($\lambda$-$MnO_2$) cathode and the improved capacity fade in lithium ion cells at elevated temperature. Any treatment that reduces the methanol reaction rate of SEI on the anode of a lithium ion spinel battery is expected to improve the capacity fade of the same battery at elevated temperature.

As will be apparent to those skilled in the art, in the light of the foregoing disclosure many alterations and modifications are possible in the practice of this invention without departing from the spirit or scope thereof. Accordingly, the scope of the invention is to be construed in accordance with the substance defined by the following claims.

What is claimed is:

1. A non-aqueous rechargeable lithium manganese oxide battery having reduced capacity fade rate during cycling at elevated temperature, said battery comprising:
   a lithium manganese oxide spinel structure compound cathode,
   a lithium insertion compound anode,
   a separator, and
   a non-aqueous electrolyte including a lithium salt dissolved in a non-aqueous solvent, wherein:
      the spinel structure compound is coated with the decomposition products of one or more compounds of foreign metals with atomic number greater than 11 that reduce the capacity fade rate of the battery during cycling at elevated temperature, wherein said decomposition products are formed by heating a mixture of said spinel structure compound and said foreign metal compounds at a temperature at which said foreign metal compounds decompose to coat the surface of said spinel structure compound without entering the bulk of the spinel structure or extracting lithium therefrom.

2. A non-aqueous rechargeable lithium manganese oxide battery as claimed in claim 1 wherein a methanol reaction of charged or de-lithiated spinel structure compound yield $k/k_0<0.9$ (one minus one standard deviation of ppm amount $H_2O$ of the untreated spinel after 40 hours at 45° C.), where k is the ppm amount of $H_2O$ generated per gram of charged-treated spinel structure in methanol after 40 hours at 45° C. and $k_0$ is the ppm amount of $H_2O$ generated per gram of charged-untreated spinel in methanol after 40 hours at 45° C.

3. A non-aqueous rechargeable lithium manganese oxide battery as claimed in claim 1 wherein the foreign metal compound is selected from one or more compounds incorporating Bi, Pb, La, Ba, Zr, Y, Sr, Zn and Mg.

4. A non-aqueous rechargeable lithium manganese oxide battery as claimed in claim 1 wherein the foreign metal compound is selected from one or more compounds incorporating Bi, Pb, La and Y.

5. A non-aqueous rechargeable lithium manganese oxide battery as claimed in claim 1 wherein the foreign metal compound is selected from one or more compounds incorporating La.

6. A non-aqueous rechargeable lithium manganese oxide battery as claimed in claim 1 wherein said mixture comprises greater than about 0.01 but less than about 5 mole % foreign metal relative to said spinel structure compound.

7. A non-aqueous rechargeable lithium manganese oxide battery as claimed in claim 1 wherein said mixture comprises greater than about 0.05 but less than 2 mole % foreign metal relative to said spinel structure compound.

8. A non-aqueous rechargeable lithium manganese oxide battery as claimed in claim 1 wherein the foreign metal compound is dissolved in water, then mixed with said spinel structure compound; and subsequently the mixture is dried then heated to coat the surface of the spinel structure with said decomposition products.

9. A non-aqueous rechargeable lithium manganese oxide battery as claimed in claim 8 wherein the heating is at above the decomposition temperature of the foreign metal compound and less than or equal to 750° C.

10. A non-aqueous rechargeable lithium manganese oxide battery as claimed in claim 1 wherein the foreign metal compound is dry-mixed with said spinel structure compound; and the mixture is subsequently heated to coat the surface of the spinel structure with said decomposition products.

11. A non-aqueous rechargeable lithium manganese oxide battery as claimed in claim 10 wherein the heating is initially at above the decomposition temperature of the foreign metal compound, then further heated to between about 600° C. and 750° C.

12. A non-aqueous rechargeable lithium manganese oxide battery as claimed in claim 1 wherein the anode comprises a carbonaceous insertion compound.

13. A non-aqueous rechargeable lithium manganese oxide battery as claimed in claim 12 wherein the carbonaceous insertion compound is graphite.

14. A non-aqueous rechargeable lithium manganese oxide battery as claimed in claim 1 wherein the lithium salt is $LiPF_6$.

15. A non-aqueous rechargeable lithium manganese oxide battery as claimed in claim 1 wherein the non-aqueous solvent is an organic carbonate.

16. A non-aqueous rechargeable lithium manganese oxide battery as claimed in claim 1 wherein the non-aqueous solvent is selected from the group consisting of ethylene carbonate, propylene carbonate, ethyl methyl carbonate, diethyl carbonate, and mixtures thereof.

17. A method for reducing the capacity fade rate during cycling at elevated temperature of a non-aqueous rechargeable lithium manganese oxide battery, the battery comprising a lithium manganese oxide spinel structure compound cathode, a lithium insertion compound anode, a separator, and a non-aqueous electrolyte including a lithium salt dissolved in a non-aqueous solvent, wherein the spinel structure compound is formed by heating a mixture of said spinel structure compound and one or more compounds of foreign metals with atomic number greater than 11 at a temperature at which said foreign metal compounds decompose to coat the surface of said spinel structure compound with decomposition products without entering said compound structure, wherein said foreign metal compounds form decomposition product coatings that reduce the capacity fade rate of the battery during cycling at elevated temperature.

18. A method as claimed in claim 17 wherein a methanol reaction of the charged or de-lithiated spinel structure compound yields $k/k_0<0.9$ (one minus one standard deviation of ppm amount $H_2O$) of the untreated spinel after 40 hours at 45° C.), where k is the ppm amount of $H_2O$ generated per gram of charged-treated spinel in methanol after 40 hours at 45° C. and $k_0$ is the ppm amount of $H_2O$ generated per gram of charged-untreated spinel in methanol after 40 hours at 45° C.

19. A method as claimed in claim 17 wherein the foreign metal compound is one or more compounds containing Bi, Pb, La, Ba, Zr, Y, Sr, Zn or Mg.

20. A method as claimed in claim 17 wherein the foreign metal compound is one or more compounds containing Bi, Pb, La or Y.

21. A method as claimed in claim 17 wherein the foreign metal compound is one or more compounds containing La.

22. A method as claimed in claim 17 wherein said mixture comprises greater than about 0.01 but less than about 5 mole % foreign metal to said spinel structure compound.

23. A method as claimed in claim 17 wherein said mixture comprises greater than about 0.0.5 but less than about 2 mole % foreign metal relative to said spinel structure compound.

24. A method as claimed in claim 17 wherein the foreign metal compound is first dissolved in water then mixed with said spinet structure compound; and subsequently the mixture is dried, then heated to coat the surface of the spinel structure with said decomposition products.

25. A method as claimed in claim 24 wherein heating is conducted at a temperature above the decomposition temperature of the foreign metal compound and less than or equal to 750° C.

26. A method as claimed in claim 17 wherein the foreign metal compound is dry-mixed with said spinet structure compound, and the mixture is subsequently heated to coat the surface of the spinel structure compound with said decomposition products.

27. A method as claimed in claim 26 wherein heating is initially at above the decomposition temperature of the foreign metal compound, then further heated to between about 600° C. and 750° C.

28. A method as claimed in claim 17 wherein the anode comprises a carbonaceous insertion compound.

29. A method as claimed in claim 28 wherein the carbonaceous insertion compound is graphite.

30. A method as claimed in claim 17 wherein the lithium salt is $LiPF_6$.

31. A method as claimed in claim 17 wherein the non-aqueous solvent comprises an organic carbonate.

32. A method as claimed in claim 17 wherein the non-aqueous solvent is selected from the group consisting of ethylene carbonate, propylene carbonate, ethyl methyl carbonate, diethyl carbonate, and mixtures thereof.

* * * * *